United States Patent
Santini

[19]

[11] Patent Number: 5,923,271
[45] Date of Patent: Jul. 13, 1999

[54] COMMUNICATION AND CODING SYSTEM FOR CONTROLLING ELECTRICAL ACTUATORS

[75] Inventor: Ernesto Santini, Sozzago, Italy

[73] Assignee: Bticino S.p.A., Milan, Italy

[21] Appl. No.: 08/887,455

[22] Filed: Jul. 2, 1997

[30] Foreign Application Priority Data

Jul. 4, 1996 [IT] Italy ................................ MI96A1370

[51] Int. Cl.⁶ .................................................... G08B 5/22
[52] U.S. Cl. ................ 341/20; 340/825.06; 340/310.01; 307/112
[58] Field of Search ................................ 340/20, 310.01, 340/310.02, 825.06; 307/112–118

[56] References Cited

U.S. PATENT DOCUMENTS

| | | | |
|---|---|---|---|
| 4,163,218 | 7/1979 | Wu | 340/310.02 |
| 4,174,517 | 11/1979 | Mnadel | 340/310.02 |
| 4,215,276 | 7/1980 | Janeway | 307/40 |
| 4,471,232 | 9/1984 | Peddie et al. | 307/35 |
| 4,745,351 | 5/1988 | Rowen et al. | 323/239 |
| 5,191,227 | 3/1993 | Deluca et al. | 307/38 |
| 5,194,858 | 3/1993 | Erwin | 340/825.7 |
| 5,237,264 | 8/1993 | Moseley et al. | 323/324 |
| 5,365,154 | 11/1994 | Schneider et al. | 318/103 |
| 5,576,700 | 11/1996 | Davis et al. | 340/825.16 |
| 5,614,811 | 3/1997 | Sagalovich et al. | 323/207 |
| 5,661,468 | 8/1997 | Marcoux | 340/825.44 |

*Primary Examiner*—Michael Horabik
*Assistant Examiner*—Albert K. Wong
*Attorney, Agent, or Firm*—Pillsbury Madison & Sutro LLP

[57] ABSTRACT

A communication and coding system for controlling at least one electrical actuator, and thus a respective electrical load, by at least one remote command device, via a single conductor which directly connects together the output of the remote command device and specific command inputs of the actuator. This ensures high versatility of controllable electrical and/or electronic functions, while at the same time allowing various remote command devices of different types to be connected to one and the same conductor and to a single actuator.

9 Claims, 8 Drawing Sheets

RATIO T4/T3=1

RATIO T4/T3=∅

RATIO T4/T3 >o
RATIO T4/T3 <1

COMMUNICATION AND CODING SYSTEM FOR CONTROLLING ELECTRICAL ACTUATORS

BACKGROUND OF THE INVENTION

This invention relates to a communication and coding system for controlling electrical actuators. Electrical actuation members are currently controlled by remote command devices in various ways: by feeding a simple electrical signal to the load, as in the case of relays; by applying a phase signal to the appropriate input by a pushbutton, as in the case of lighting dimmers; and by using serial lines conveying digital signals, as in the case of particularly advanced actuators, which can also be connected to digital command buses. Each currently used control method however presents drawbacks and disadvantages for installers and final users. The most simple methods from the electrical viewpoint, i.e. controlling by a state signal or the temporary application of a phase signal by means of a pushbutton, do not allow large versatility in controllable functions, which remain limited to load switch-on and switch-off, and possibly dimmer adjustment for lighting devices.

Other methods involve feeding the electrical actuator with variable voltages or currents, which provide information regarding load switch-on or switch-off and offer the possibility of adjustment to intermediate control values, proportional to the fed voltage or current.

These method have however the drawback of not enabling (or at least only with great difficulty enabling) several command devices to be used, positioned in parallel and connected to the same actuator. The most complex methods, which also involve serial communication between control circuits and the electrical actuator, are reliable and can comprise many control devices connectable to a single actuator, but are extremely costly.

Hence, in none of the aforesaid cases used up to the present time is it possible to connect to one and the same actuator a multiplicity of different-type command devices of circuit complexity proportional to the functions to be performed, in a simple and economical manner.

SUMMARY OF THE INVENTION

An object of the present invention is to solve the aforesaid problems by defining in particular a communication and coding system for controlling electrical actuators, which provides high versatility of controllable electrical and electronic functions, while at the same time allowing various remote command devices of different types to be connected to one and the same conductor and to a single actuator.

A further object of the invention is to provide a communication and coding system which can also be installed within traditional circuit systems and arrangements, without involving considerable work or modification.

A further object of the present invention is to define a communication and coding system which can be implemented without the use of complex electrical and electronic technology and/or costly materials.

Advantageously, the system of the invention comprises at least one actuator, connected to a constant-frequency electrical mains supply and to a series of controlled electrical loads, such as incandescent lamps, each provided with a specific command input. The electrical actuators are provided internally with microcontrollers or state machines able to interpret the signals reaching the command input in accordance with predefined coding, for the purpose of translating them into specific actions on electrical loads controlled by them.

The system therefore comprises an assembly of different-type remote command devices traversed by a phase signal of the electrical mains supply and are each provided with a specific control output, and finally a single-wire electrical conductor which directly connects remote command device outputs and actuator inputs together; in the absence of commands, this conductor is in its rest condition.

BRIEF DESCRIPTION OF THE DRAWINGS

Further characteristics and advantages of the invention will be more apparent from the description of a preferred but not exclusive embodiment of the communication and coding system of the invention, illustrated by way of non-limiting example on the accompanying schematic drawings, in which.

DETAILED DESCRIPTION

Figure 1:
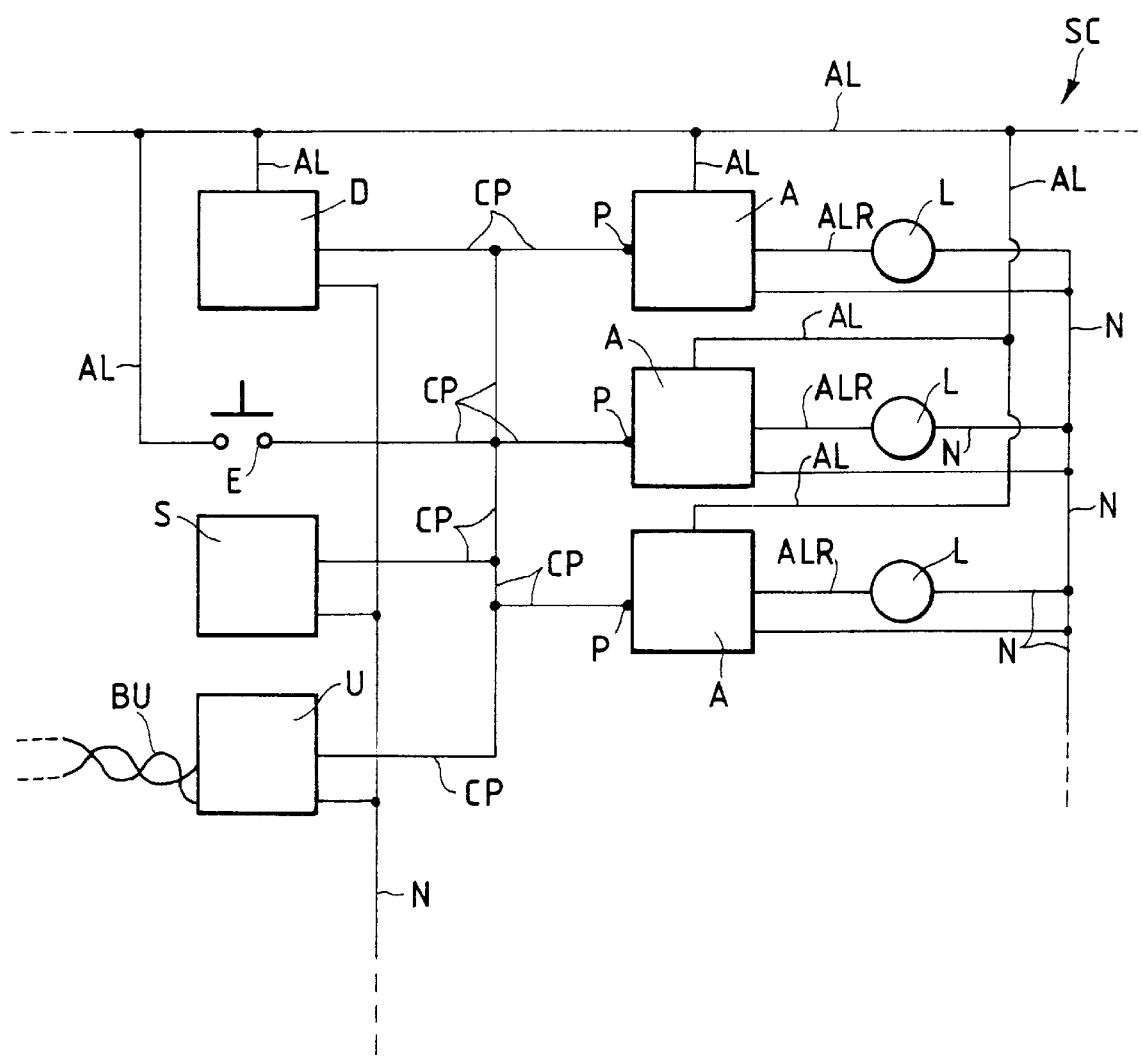
FIG. 1 is a block diagram of the communication and coding system for controlling electrical actuators, according to the present invention.
Figure 2:
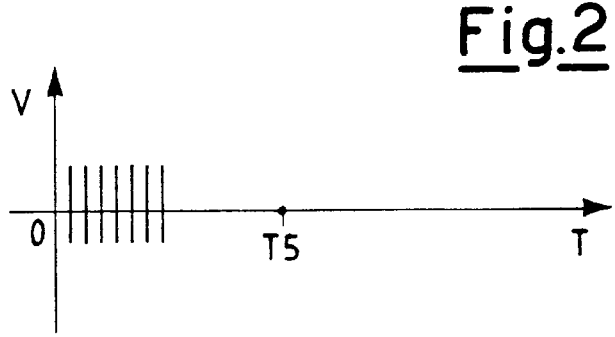
FIG. 2 is a cartesian graph showing the time-variation of the voltage relative to a load switch-on or switch-off signal fed by a first remote command device of the communication and coding system, according to the present invention.
Figure 2A:
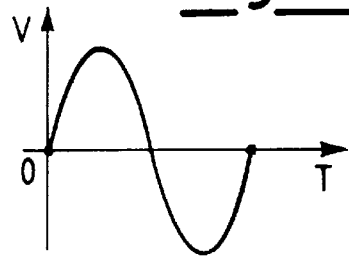
FIG. 2A is an enlarged version of a portion of the graph shown in FIG. 2.
Figure 3:
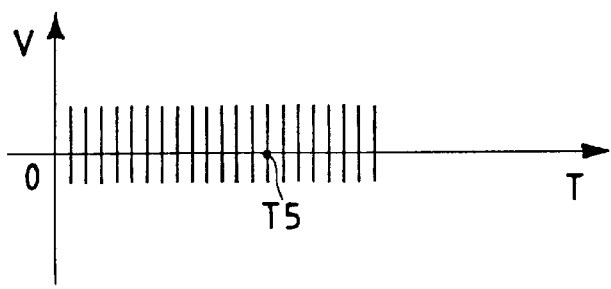
FIG. 3 is a cartesian graph showing the time-variation of the voltage relative to a load brightness adjustment signal fed by the remote command device of FIG. 2, according to the present invention.
Figure 4:
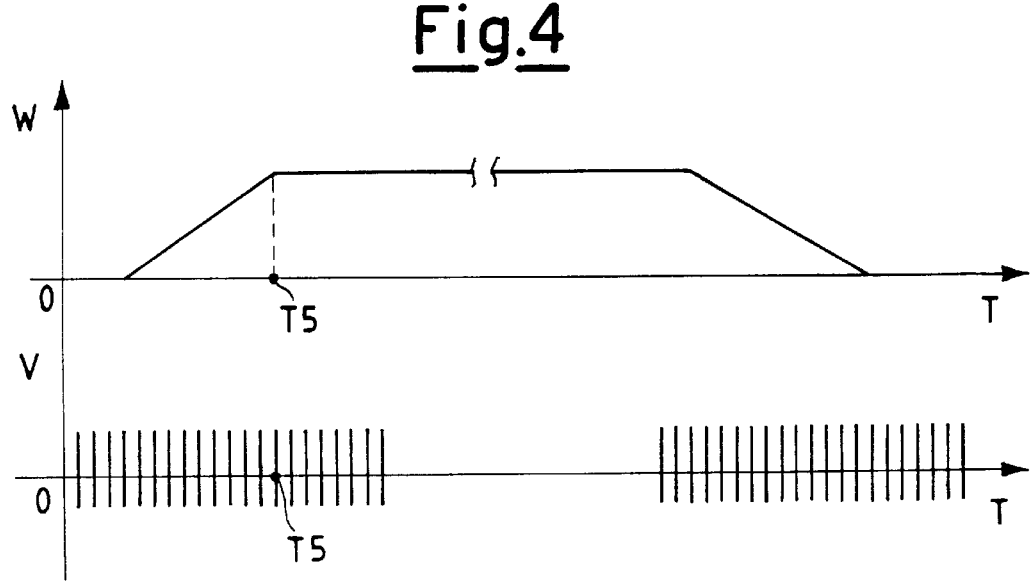
FIG. 4 is a cartesian graph showing the time-variation of the voltage relative to a load switch-on signal, followed by a brightness adjustment signal and by a load switch-off signal, which are fed by the remote command device of FIG. 2, according to the present invention.
Figure 9:
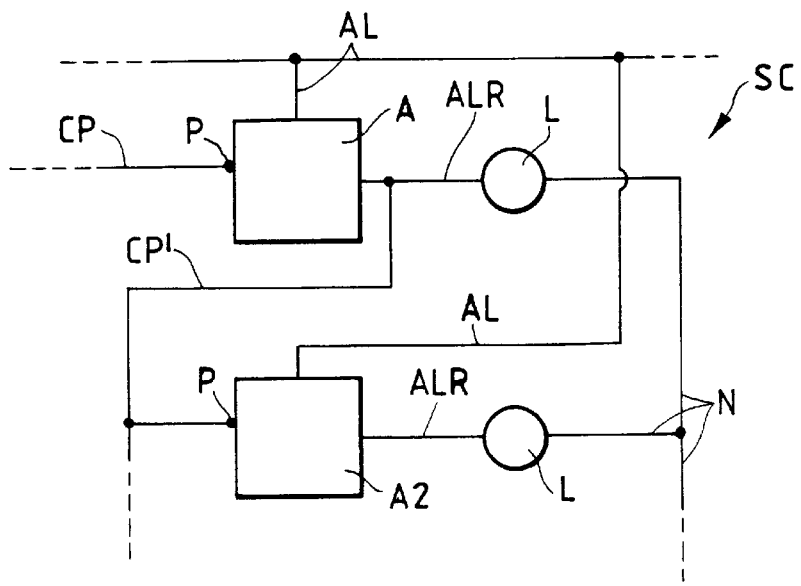
FIG. 9 is a partial block diagram of a modification of the communication and coding system, according to the present invention.
Figure 10:
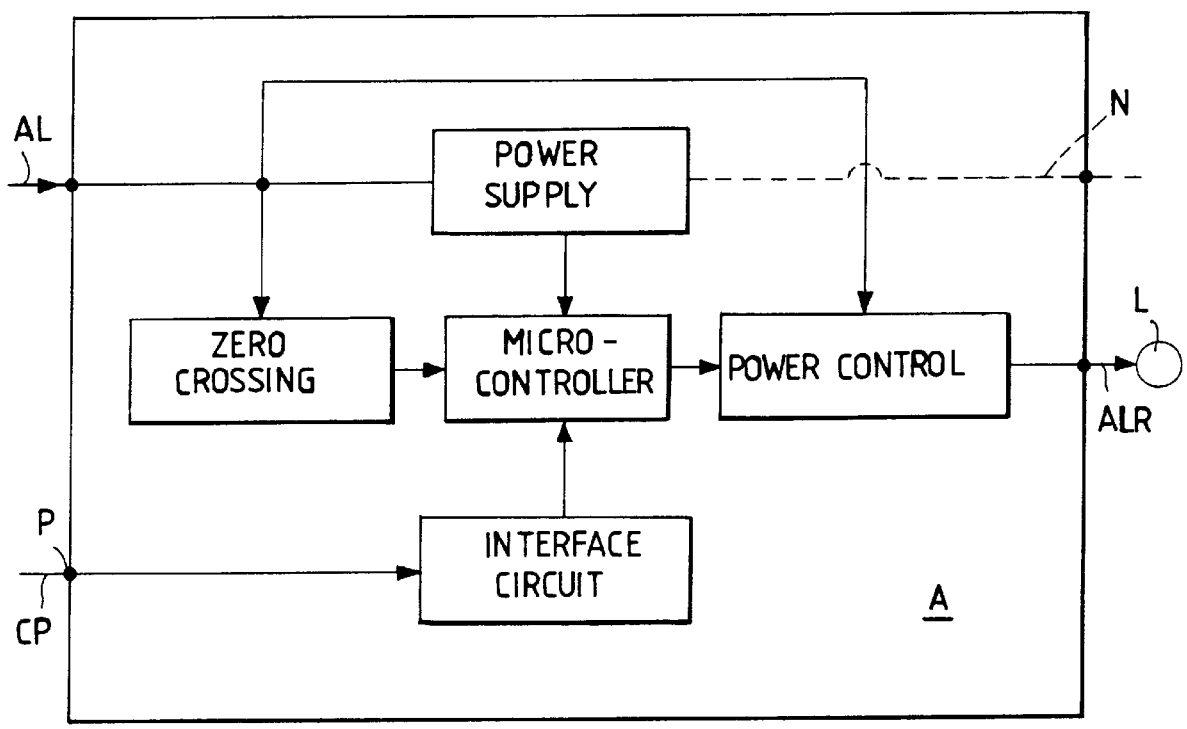
FIG. 10 is a block diagram showing the internal structure and the electrical connections of an actuator A, according to FIG. 1.
Figure 11:
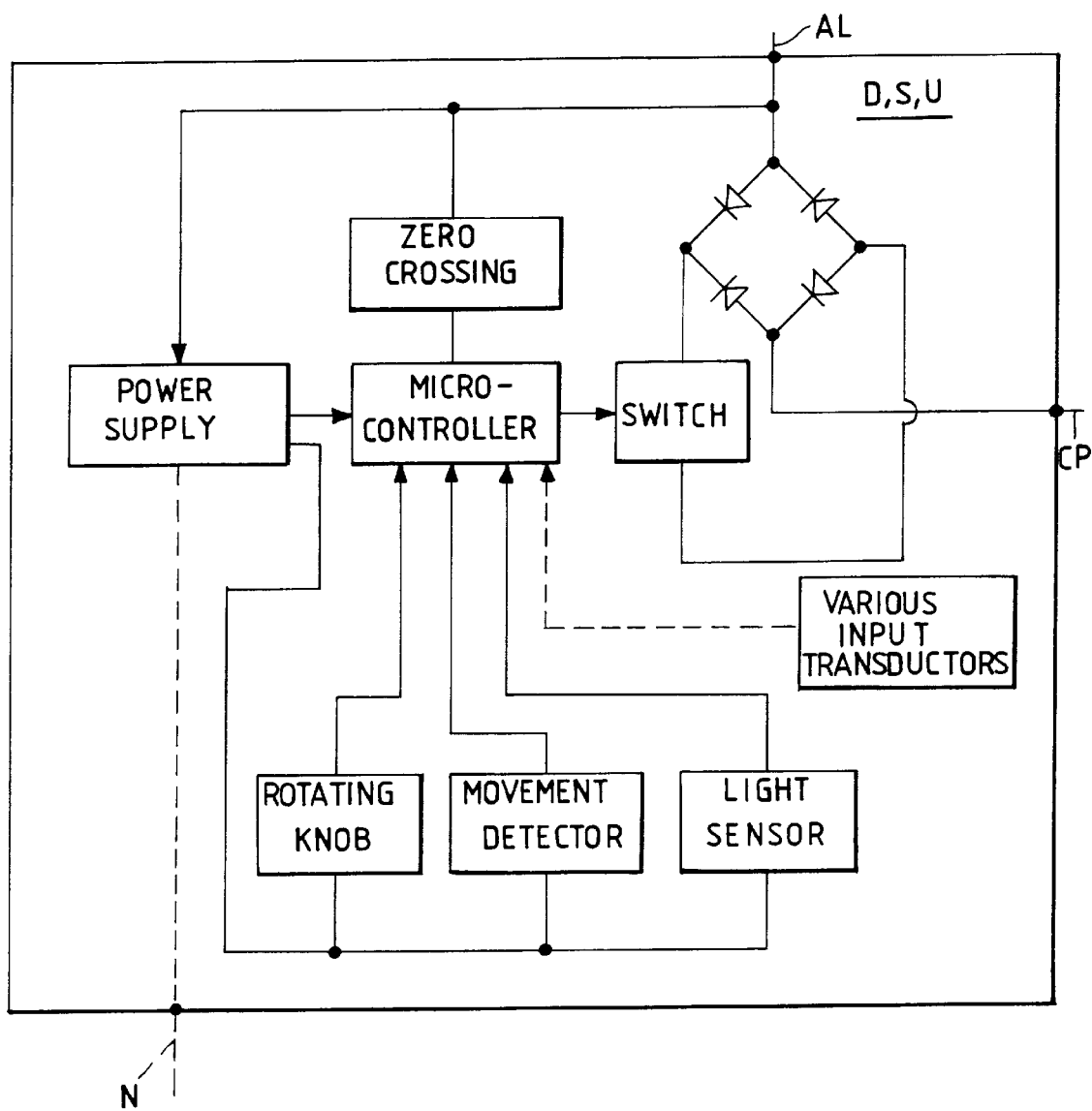
FIG. 11 and FIG. 12 are two examples of block diagrams of two respective command devices.
Figure 12:
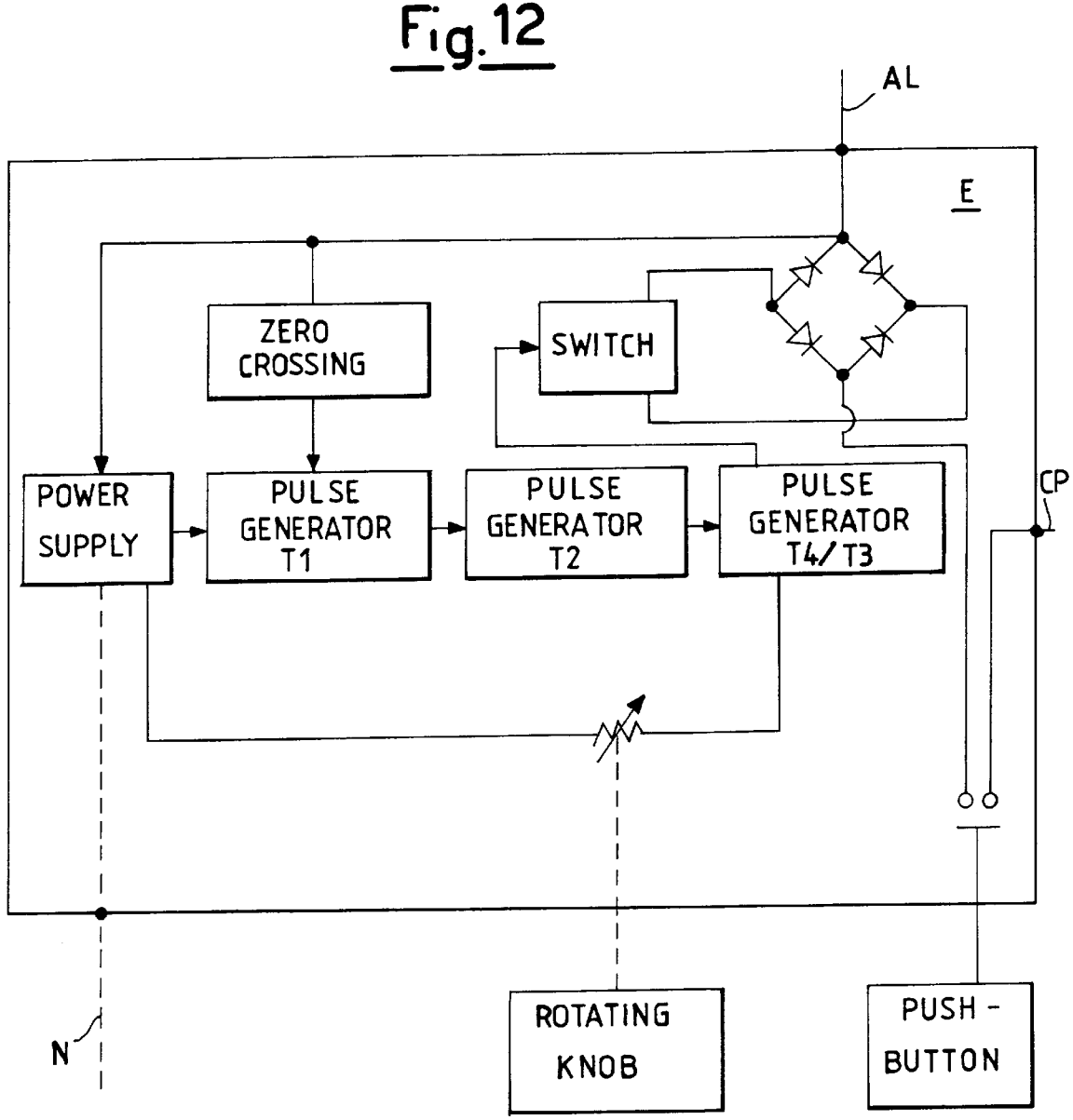

With reference in particular to FIGS. 1 and 9, SC indicates overall the communication and coding system for controlling electrical actuators A, according to the present invention, AL indicates an electrical mains supply of sinusoidal voltage and constant frequency, for example a 230 V mains supply, N indicates the neutral conductor of the mains AL, L indicates the controlled electric loads, for example incandescent lamps, each provided with an electrical actuator A with a specific command input P, and ALR indicates an electrical conductor which transmits the command signal from the actuator A to the corresponding load L. D, E, S, U respectively indicate each four particular remote command devices, connected to the phase conductor of the electrical mains supply AL and provided with a command output for the actuators A. Specifically, D indicates a knob command device with double movement, in which pressing the accompanying button determines switch-on, switch-off and memorization of the brightness values set for the lamps L, whereas rotating the knob adjusts the brightness of the lamps L; E indicates a pushbutton command device to interrupt or feed an electrical signal to the actuators A; S indicates a sensor device (for brightness, presence or other); and U indicates an interface able to receive commands from a digital communication bus BU to then convert them into an electrical command to feed to the actuators A.

Finally, CP indicates a control conductor which directly connects together the outputs of the remote command devices D, E, S, U, and the command inputs P of the actuators A; in the absence of commands, the control conductor CP is in its rest condition. With particular reference to FIGS. 2, 2a, 3, 4, 5, 6, 7 and 8, V, W along the vertical axis of the cartesian graphs indicate voltage and power signals respectively, T along the horizontal axis of the cartesian graphs indicates time, and T1, T2, T3, T4, T5 indicate particular time periods along the horizontal axis of the various graphs.

The operation of the various remote command devices D, E, S, U, together with the type of coding of the commands which they are able to feed to the actuators A, in a particular embodiment of the invention is now described by way of non-limiting example, in which the remote command devices D, E, S, U behave as dimmers for load lamps L.

The pushbutton command device E can feed a switch-on or switch-off command and an adjustment command to the load lamps L via the actuators A.

The switch-on or switch-off command is fed by pressing the pushbutton E. The pushbutton E is pressed for a time less than a predefined limiting time value T5.

This connects the control conductor CP to the phase of the sinusoidal mains AL voltage, resulting in feeding of a corresponding limited number of complete sine waves at mains AL frequency to the command input P of the actuators A.

The load lamps L are powered or extinguished cyclically at each pressing of the pushbutton E.

The command for adjusting the brightness of the lamps L is achieved by pressing the pushbutton E for a time exceeding the predefined limiting value T5, to feed whole sine waves at mains AL frequency to the input P of the actuators A.

This is sensed by the actuators A, which power the lamps L via the conductor ALR whatever the preceding state, and enter the adjustment cycle to increase and decrease the brightness of the load lamps L.

The desired brightness value is maintained by the actuator A the moment in which the pushbutton E is released. A switch-off operation follower by a switch-on operation restores the last brightness value set by the adjustment cycle.

The knob command device D can also feed switch-on or switch-off and adjustment commands.

In a manner similar to the pushbutton command device E, switch-on and switch-off are achieved by axially pressing the knob D for a time less than the predetermined time T5.

Applying along the control conductor CD a train of whole sine waves, half-waves or parts thereof taken from the electrical mains supply AL and continuing for a time less than the predetermined time T5 causes load switch-off if previously switched on and switch-on if previously switched off.

In contrast, applying along the control conductor CD a train of whole sine waves, half-waves or parts thereof continuously for a time exceeding the time T5 activates a cycle of adjustment of the electrical power W fed to the load, such that the electrical power W is proportional to the time for which the wave train is maintained.

The electrical power W reaches an extreme value and remains defined until the next application of wave trains taken from the mains AL.

Alternatively, the direction of adjustment can be reversed by persisting with the wave train. The brightness level of the lamps L, operated by the actuators A, is the last brightness level set by any one command device D, E, S, U of those provided in the communication and coding system SC of the present invention.

Figure 6:
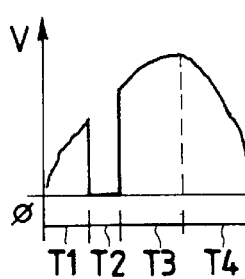
FIG. 6 is a cartesian graph showing the time-variation of the voltage relative to a load adjustment signal fed by the remote command device of FIG. 5, according to the present invention.
Figure 7:
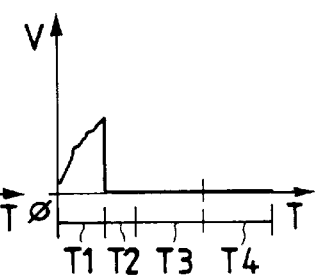
FIG. 7 and FIG. 8 are two cartesian graphs showing examples of the time-variation of signals comprising load switch-on, adjustment and switch-off functions, which are fed by a third remote command device of the communication and coding system, according to the present invention.
Figure 8:
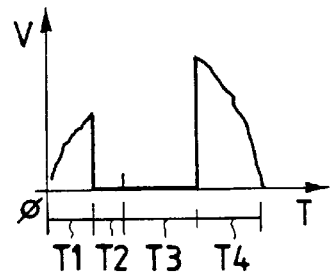

Load brightness adjustment is hence effected by rotating the knob D, which is proportional to the brightness value desired. When this value has been reached, the knob D is pressed for a time exceeding the predefined limiting value T5, so as to feed to the command inputs P of the actuator A, for the entire pressing time, a periodic signal of particular form (examples in this sense are shown in FIGS. 6, 7, 8), taken from the sinusoidal voltage signal (shown in FIG. 5) withdrawable from the electrical mains supply AL, in which the form of an individual half-wave is divided into three time periods T1, T2, T3, within the third time period T3 there being contained a fourth time period T4 of conduction of the signal along the conductor CP, and proportional to the angular position of the knob D.

Alternatively, the knob D can be pressed to power the load lamps L, after which the adjustment is made by rotating the knob D, while simultaneously pressing.

If the form of an individual component half-wave of the command train is divided into three time periods T1, T2, T3 (as stated heretofore), in which during the first time period T1 there is signal conduction along the conductor CP, during the second time period T2 there is no conduction, and the third time period T3 contains a conduction period T4, the electrical power W fed to the load is proportional to the ratio of the time periods T4 and T3 respectively. In other words, whereas the first, second and third time periods temporarily succeed one another, the fourth time period is contemporaneous with a variable-length portion of the third time period.

The desired brightness value of the load lamps L is therefore proportional to the angle of rotation of the knob D about its axis. Different angles of the knob D result in a like variation in the duration of conduction of an individual half-wave (component of the command wave train), which corresponds to the time period T4 of the signal of FIG. 8.

The interface U, which is connected to a digital communication bus BU, can feed the actuator A, via the control conductor CP, with all the aforedescribed signals, following commands originating from the digital bus BU.

Figure 5:
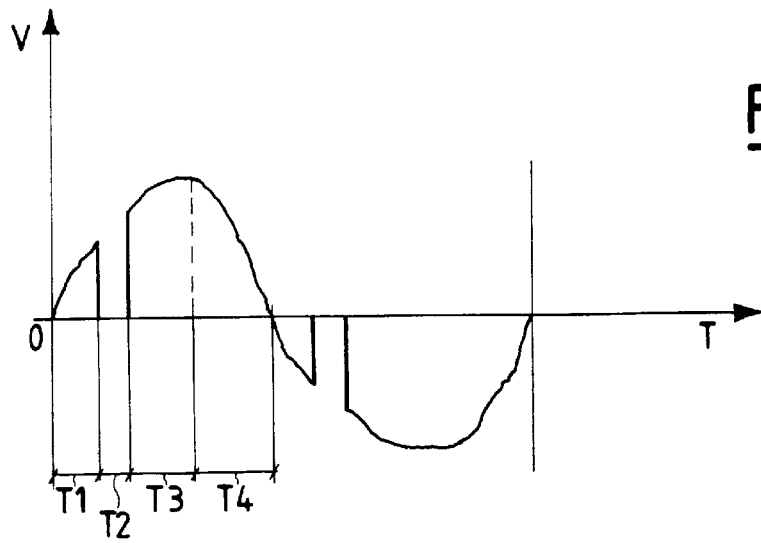
FIG. 5 is a cartesian graph showing the time-variation of the voltage relative to a load switch-on or switch-off signal fed by a second remote command device of the communication and coding system, according to the present invention.

It can also set the actuator A to desired brightness values for the load L by simulating an adjustment procedure, i.e.

maintaining for a time exceeding the prefixed limiting value T5 that half-wave of the signal of FIG. 5 corresponding to the time period T3 in a manner proportional to the brightness value required for the load lamp L.

The sensor device S can be of various types, for example it can be a presence or darkness sensor. The command fed along the control conductor CP by the sensor S can be a switch-on command for the load lamp L, followed by a switch-off command upon reaching a given condition (a predetermined time, a required brightness level, for example, for self-adjustment, etc.).

Finally the remote command devices D, E, S, U can be represented by a regulated output of a first actuator A which, via a control conductor CP', is returned to the input of a second actuator A2 of the system SC, in accordance with the connection diagram of FIG. 9.

In this case, the electrical actuator A2 enters into self-adjustment, by positioning itself at the brightness level present along the conductor ALR leaving the actuator A, consequent on switching-off and switching-on the load lamps L.

The application of a voltage signal dependent on the electrical output power W of each actuator A to the control conductor CP causes an electrical power value W to be fed to the load L connected to the actuator A2 which is proportional to the level sensed along the electrical conductor ALR leaving the actuator A.

In FIGS. 2–8 and 12–14, T1, T2, T3 and T5 are fixed values of four respective particular time periods, which are supplied by pulse generators.

Figure 13:
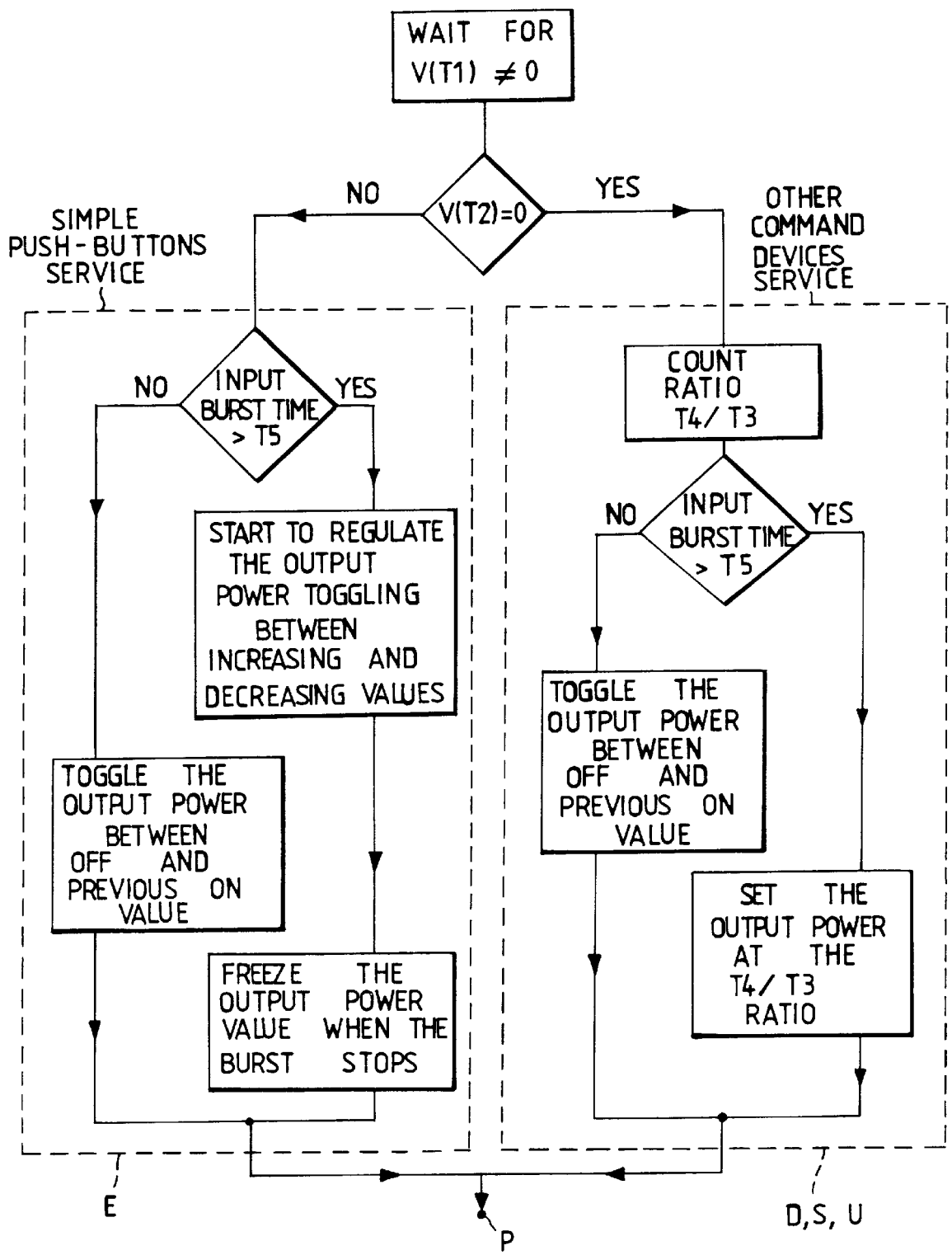
FIG. 13 is a first example of a main flow diagram of the actuator input control.
Figure 14:
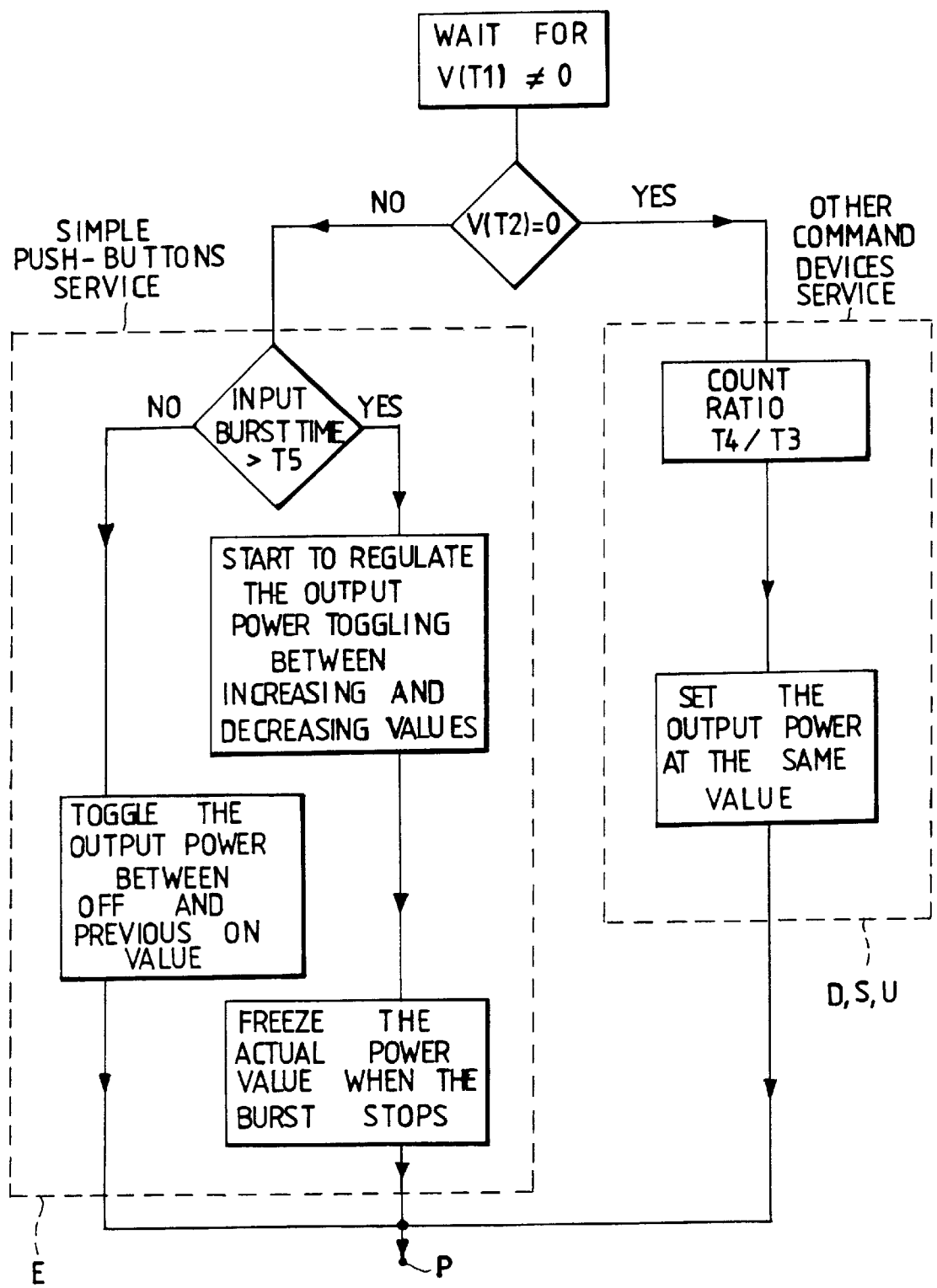
FIG. 14 is a second example of a main flow diagram of an alternate actuator input control.

If the value of the voltage relative to a load signal fed by a remote command device D, E, S, U, during the time periods T1 and T2, is different from zero (see FIGS. 5 and 6), a push-button command device E can feed a switch-on or switch-off command and an adjustment command to the load L, via the actuator A (see FIGS. 13 and 14).

If the push-button E is pressed for a time less than a pre-defined time value T5, a corresponding limited number of complete sine-waves (see FIG. 2A) at mains frequency AL are fed to the command input P of the actuator A; in this case, the actuator input coded control CP provides for toggling the output power between off and the previous on value (see FIG. 13).

Alternatively, if the push-button E is pressed for a time exceeding the pre-defined time value T5, the input control CP provides for starting to regulate the output power toggling between increasing and decreasing values and for freezing the output power value when the push-button E is released and a pre-fixed input burst time value, that is greater than the time value T5, stops (see FIG. 13).

In a manner similar to the push-button device E, switch-on, switch-off and adjustment commands for a load L (for example, a lamp) can also be fed by other command devices, such as a rotating knob.

In fact, if the value of the voltage relative to a load signal, during the time period T1, is different from zero (conduction) and, in the meantime, it is equal to zero, during the time period T2 (no conduction), other remote command devices, such as rotating knobs D, movement detectors and light sensors S or other various input transducers U, can feed signal conduction along the conductor CP to the load L; in this case, the electrical power W fed to the load L is proportional to the ratio T4/T3, which is set between the values 0 and 1, according to the graphs of the FIGS. 7, 8 and then, for example, a desired brightness value of the load L is proportional to the angle of rotation of a knob D, that can be operated by a user, which results in a similar variation in the duration of conduction of an individual half sine-wave, corresponding to the time period T4 (three examples of individual half sine-waves are represented in FIGS. 6, 7 and 8 for three values of the ratio T4/T3).

The command devices D, S, U can feed the actuators A, via the control conductors CP, with the above-mentioned signals, following commands originating from the actuator input control (see FIGS. 13, 14).

The actuator A can be set to desired brightness values for the load L by maintaining for an input burst time exceeding the pre-fixed time value T5 those half sine-waves of the signals of the FIGS. 7 and 8, corresponding to the time period ratios T4/T3=0 and 0<T4/T3<1, in a manner proportional to the brightness value required by a user for the load L.

In this case, the actuator input control provides for setting the output power at the T4/T3 ratio value (see FIG. 13); on the contrary, if the actuator A is set by maintaining those half sine-waves for an input burst time less than the pre-fixed time value T5, the actuator input control provides for toggling the output power between off and the previous on value (see FIG. 13).

The command fed along the control conductor CP by a remote command device of the type D, S or U can also be a switch-on command for the load L, followed by a switch-off command on reaching a given condition, when the actuator input control provides for setting the output power at a value equal to the count ratio value T4/T3 (see FIG. 14).

Finally, the characteristics of the communication and coding system for controlling electrical actuators allow the user to have a great number of controllable functions with only one system, because of the multiplicity of signals applicable to the same control conductor and because of the versatility of the system, as various devices are able to command the same actuator and the same desired load.

Furthermore, it is hence possible to use, at extremely low costs, only one push-button, that is to say a very simple device, or a regulating knob command device, connected to the phase of the electrical mains supply, for activating the same actuator.

From the aforegoing description, the characteristics of the communication and coding system for controlling electrical actuators according to the present invention are evident, as are its advantages.

In particular, these are represented by:

considerable versatility of controllable functions, because of the multiplicity of signals applicable to the control conductor and the variety of types of devices within the actuators, able to reconstruct the desired behavior from the input signals;

maintenance of the traditional configuration in parallel with the remote command devices, resulting in the possibility of connecting command devices of different type to the same control conductor, provided these are of the scheduled types (it is hence possible to use both a pushbutton connected to the phase of the electrical mains supply and a knob command device, a sensor or an interface for connection to digital communication buses for activating the same actuator);

possibility of positioning several actuators in parallel, while at the same time ensuring functional balance (all switched on or off simultaneously, or all under adjustment at the same percentage);

extremely low cost of the remote command devices, such as the phase-connected pushbutton;

possibility of easily connecting several actuators in a master/slave configuration, in which only the master actuator is connected to the control conductor; and possibility of using the communication and coding system of the present invention in traditional-method electrical installations and systems (for example comprising dimmers and adjustment pushbuttons).

It is apparent that numerous modifications can be made by an expert of the art to the communication and coding system of the present invention, but without leaving the scope of protection of the inventive idea, that in the practical implementation of the invention the forms of the illustrated details can be different, and that these can be replaced by technically equivalent elements.

I claim:

1. A communication and coding system, comprising:

at least one electrical actuator arranged for connection to an electrical mains supply for feeding to said actuator a sinusoidal voltage;

at least one remote command device associated with each said actuator;

at least one electrical load element arranged to have electrical power dissipated by operation thereof;

each said electrical load element having at least one neutral conductor effectively connected thereto and being arranged for connection to the electrical main supply;

respective electrical connection means effectively connecting each said electrical load element with a respective said actuator;

each said remote command device being arranged to provide as an output, and each said actuator being arranged to receive from a respective at least one remote command device as an input, at least one specific command, providing electronic coding for at least one of feeding, interrupting feeding and adjusting feeding of electrical power to a respective said load element;

each said remote command device and each said actuator being arranged to be connected to a phase of the electrical mains supply;

each said actuator being effectively connected to a respective at least one remote command device by a respective electrical control conductor for collecting electrical signals for the respective said actuator from the respective at least one remote command device, for controlling a respective said electrical load via the respective said actuator;

said electronic coding, as fed along the respective said electrical control conductor, including a train of sinusoidal half-waves, in which variation with time of each half wave thereof is divided into three portions, of which a first portion corresponds to a first time period, during which the respective said electrical control conductor conducts, a second portion corresponds to a second time period, during which the respective said electrical conductor is not conducting, and a third portion corresponds to a third time period, during which the respective said electrical conductor conducts.

2. The communication and coding system of claim 1, wherein:

said at least one remote command device is constituted by at least one device selected from the group consisting of a pushbutton, a control and adjustment knob, an interface for connection to a digital communication box and a sensor.

3. The communication and coding system of claim 2, wherein:

said sensor is selected from the group consisting of a brightness sensor, a darkness sensor and a presence sensor.

4. The communication and coding system of claim 2, wherein:

said control and adjustment knob is arranged for undergoing rotary and axial movement, such that upon axial pressing of said knob throughout a pressing time, there is fed along the respective said electrical control conductor, throughout all of said pressing time, a periodic voltage signal obtained from said sinusoidal voltage, in which variation in individual half-waves with time is divided into said three portions respectively corresponding to said three time periods respectively corresponding to said three time periods; said third time period including within said third time period a fourth time period during which conduction of said period voltage signal is proportional to angular positioning of said knob about an axis of rotation.

5. The communication and coding system of claim 1, wherein:

said third time period includes within said third time period a fourth time period which is shorter than said third time period; and said at least one actuator, upon receiving a respective said at least one specific command, is arranged to cause the respective said load element to be fed electrical power at a level which is related to the rates of the length of said fourth period to the length of said third period, times a datum level.

6. The communication and coding system of claim 1, wherein:

said at least one actuator is arranged to be commanded by a respective said at least one remote command device to cause a respective said load element to be switched off, if on, and to be switched on, if off, upon receiving as said input a train of whole sine waves, or half-waves, or parts thereof, throughout a time period which is of less than a predetermined duration; and said at least one activator is arranged to be commanded by a respective said at least one remote command device to cause a respective said load element to increase, or to decrease power to a respective said load element, upon receiving said input throughout a time period which is of greater than said predetermined duration, said increase or decrease being proportional to duration of said input.

7. The communication and coding system of claim 1, wherein:

said at least one actuator comprises at least two actuators associated with a same said at least one remote command device, for coordinated control of electrical power supply to a respective at least two load elements.

8. The communication and coding system of claim 1, wherein:

at least one said load element is an incandescent lamp.

9. The communication and coding system of claim 1, wherein:

each said electrical actuator comprises a plurality of control devices selected from microcontrollers and state machines, and arranged to generate said coding, to interpret signals reaching the respective actuator as input into respective specific commands for controlling power to the respective said load element; and each said actuator being colocated in a same installation together with each said remote command device associated therewith.

* * * * *